United States Patent
Liu

(10) Patent No.: US 10,827,067 B2
(45) Date of Patent: Nov. 3, 2020

(54) TEXT-TO-SPEECH APPARATUS AND METHOD, BROWSER, AND USER TERMINAL

(71) Applicant: GUANGZHOU UCWEB COMPUTER TECHNOLOGY CO., LTD., Guangzhou (CN)

(72) Inventor: Xiang Liu, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 98 days.

(21) Appl. No.: 15/730,462

(22) Filed: Oct. 11, 2017

(65) Prior Publication Data

US 2018/0109677 A1 Apr. 19, 2018

(30) Foreign Application Priority Data

Oct. 13, 2016 (CN) .......................... 2016 1 0894538

(51) Int. Cl.
| | | |
|---|---|---|
| *G10L 15/00* | (2013.01) | |
| *H04M 3/493* | (2006.01) | |
| *G10L 13/02* | (2013.01) | |
| *G10L 13/08* | (2013.01) | |
| *G10L 15/08* | (2006.01) | |

(Continued)

(52) U.S. Cl.
CPC .......... *H04M 3/4938* (2013.01); *G10L 13/02* (2013.01); *G10L 13/08* (2013.01); *G10L 15/08* (2013.01); *G10L 15/22* (2013.01); *H04L 29/0809* (2013.01); *G10L 15/1822* (2013.01); *G10L 15/26* (2013.01); *G10L 15/30* (2013.01); *H04L 67/02* (2013.01)

(58) Field of Classification Search
USPC ................................................. 704/257–275
See application file for complete search history.

(56) References Cited

U.S. PATENT DOCUMENTS

| | | |
|---|---|---|
| 5,173,691 A | 12/1992 | Sumner |
| 5,729,741 A | 3/1998 | Liaguno et al. |

(Continued)

FOREIGN PATENT DOCUMENTS

| | | |
|---|---|---|
| CN | 102567321 A | 7/2012 |
| CN | 103020278 A | 4/2013 |

(Continued)

OTHER PUBLICATIONS

First Search dated Aug. 28, 2019, issued in related Chinese Patent Application No. 201610894538.0 (1 page).

(Continued)

*Primary Examiner* — Jesse S Pullias
(74) *Attorney, Agent, or Firm* — Sheppard Mullin Richter & Hampton LLP

(57) ABSTRACT

A text-to-speech method includes outputting an instruction according to voice information entered by a user; obtaining text information according to the instruction; converting the text information to audio; and playing the audio. According to the embodiments of the present invention, news or other text content in a browser can be played by voice, which liberates hands and eyes of a user. The user can use the browser in some scenarios where the user cannot easily use the browser, such as driving a car, thereby improving user experience.

13 Claims, 5 Drawing Sheets

(51) Int. Cl.
  *G10L 15/22* (2006.01)
  *H04L 29/08* (2006.01)
  *G10L 15/26* (2006.01)
  *G10L 15/18* (2013.01)
  *G10L 15/30* (2013.01)

(56) References Cited

U.S. PATENT DOCUMENTS

| | | | |
|---|---|---|---|
| 5,850,629 | A | 12/1998 | Holm |
| 5,884,262 | A | 3/1999 | Wise et al. |
| 6,035,336 | A | 3/2000 | Lu et al. |
| 6,324,511 | B1 | 11/2001 | Kiraly et al. |
| 6,684,183 | B1 * | 1/2004 | Korall ............... G06F 17/271 704/257 |
| 6,751,592 | B1 | 6/2004 | Shiga et al. |
| 6,895,084 | B1 | 5/2005 | Saylor et al. |
| 7,062,437 | B2 | 6/2006 | Kovales et al. |
| 7,260,533 | B2 | 8/2007 | Kamanaka |
| 7,263,484 | B1 * | 8/2007 | Cardillo ............. G10L 13/08 704/236 |
| 7,356,470 | B2 | 4/2008 | Roth et al. |
| 7,966,185 | B2 | 6/2011 | Eide |
| 8,219,398 | B2 | 7/2012 | Marple et al. |
| 8,447,598 | B2 | 5/2013 | Chutorash et al. |
| 8,566,102 | B1 * | 10/2013 | Bangalore ........... G10L 15/22 704/270.1 |
| 9,009,592 | B2 | 4/2015 | Friend et al. |
| 9,761,219 | B2 | 9/2017 | Xu et al. |
| 2003/0061049 | A1 * | 3/2003 | Erten ................. G10L 13/08 704/260 |
| 2004/0117189 | A1 * | 6/2004 | Bennett ............. G06F 17/27 704/270.1 |
| 2005/0060156 | A1 * | 3/2005 | Corrigan ............ G06F 17/21 704/270.1 |
| 2006/0259303 | A1 * | 11/2006 | Bakis ................ G10L 13/10 704/268 |
| 2007/0208570 | A1 * | 9/2007 | Bhardwaj ............ H04M 3/51 704/270.1 |
| 2007/0239837 | A1 * | 10/2007 | Jablokov ........... G06Q 30/0251 709/206 |
| 2008/0270142 | A1 * | 10/2008 | Srinivasan .......... G06F 16/957 704/270.1 |
| 2010/0036667 | A1 * | 2/2010 | Byford ............... G10L 15/22 704/270 |
| 2010/0121638 | A1 * | 5/2010 | Pinson ................ G10L 15/32 704/235 |
| 2017/0270929 | A1 * | 9/2017 | Aleksic ............... G06F 40/30 |

FOREIGN PATENT DOCUMENTS

| | | |
|---|---|---|
| CN | 103778797 A | 5/2014 |
| CN | 105843839 A | 8/2016 |
| CN | 105975469 A | 9/2016 |

OTHER PUBLICATIONS

First Office Action dated Sep. 9, 2019, issued in related Chinese Patent Application No. 201610894538.0 (6 pages).

* cited by examiner

TEXT-TO-SPEECH APPARATUS AND METHOD, BROWSER, AND USER TERMINAL

CROSS-REFERENCE TO RELATED APPLICATION

This application is based on and claims priority to and benefits of Chinese Patent Application No. 201610894538.0, filed with the State Intellectual Property Office (SIPO) of the People's Republic of China on Oct. 13, 2016, the entire contents of which is incorporated herein by reference.

TECHNICAL FIELD

The present application relates to the field of browser technologies, and specifically, to a text-to-speech apparatus and method, a browser, and a user terminal.

RELATED ART

People usually use a browser to read news. Generally, a user taps a corresponding news link on a touch screen by hand, and then views news content with his/her eyes. However, in some scenarios where the user's hands and eyes are already occupied, for example, when the user is driving, the user cannot easily operate the browser, making it difficult for the user to browse news.

SUMMARY

The present disclosure provides a text-to-speech apparatus and method, a browser, and a user terminal, for playing news by voice, thereby resolving a technical problem that a user cannot easily operate a browser in some scenarios.

According to a first aspect, an embodiment of the present disclosure provides a text-to-speech apparatus, implementable by a user terminal having a browser. The text-to-speech apparatus includes: a voice analysis module, configured to output an instruction according to voice information entered by a user; an obtaining module, configured to obtain text information according to the instruction; a conversion module, configured to convert the text information to audio; and a playing module, configured to play the audio.

According to a second aspect, an embodiment of the present disclosure further provides a text-to-speech method, implementable by a user terminal having a browser. The text-to-speech method includes: outputting an instruction according to voice information entered by a user; obtaining text information according to the instruction; converting the text information to audio; and playing the audio.

According to a third aspect, an embodiment of the present disclosure further provides a browser, including the foregoing text-to-speech apparatus.

According to a fourth aspect, an embodiment of the present disclosure further provides a user terminal, including: a memory, a processor, and a text-to-speech apparatus. The text-to-speech apparatus is installed in the memory and includes one or more software function modules that can be executed by the processor, and the text-to-speech apparatus includes: a voice analysis module, configured to output an instruction according to voice information entered by a user; an obtaining module, configured to obtain text information according to the instruction; a conversion module, configured to convert the text information to audio; and a playing module, configured to play the audio.

According to a fifth aspect, an embodiment of the present disclosure further provides a non-transitory computer-readable storage medium storing instructions that, when executed by a processor of a computer system, cause the computer system to perform a method comprising outputting an instruction according to voice information entered by a user, obtaining text information according to the instruction, converting the text information to audio, and playing the audio.

According to a sixth aspect, an embodiment of the present disclosure further provides a user terminal including a processor, and a memory storing instructions that, when executed by the processor, cause the processor to obtain an instruction according to voice information entered by a user, obtain text information according to the instruction, convert the text information to audio, and play the audio.

According to the text-to-speech apparatus and method, the browser, and the user terminal provided in the embodiments of the present invention, an instruction is output according to voice information entered by a user; text information is obtained according to the instruction; the text information is converted to audio; and the audio is played. According to the embodiments of the present invention, news or other text content in a browser can be played by voice, which liberates hands and eyes of a user. The user can use the browser in some scenarios where the user cannot easily use the browser, such as driving a car, thereby improving user experience.

To make the foregoing objective, features and advantages of the present disclosure clearer and more comprehensible, the following provides a detailed description with reference to accompanying drawings by using preferred embodiments.

BRIEF DESCRIPTION OF THE DRAWINGS

To describe the technical solutions in the embodiments of the present invention more clearly, the following briefly describes the accompanying drawings required for describing the embodiments. It should be understood that, the accompanying drawings in the following description show merely some embodiments of the present invention, and shall not be construed as any limitation to the scope of the invention. A person of ordinary skill in the art may still derive other drawings from these accompanying drawings without creative efforts.

DETAILED DESCRIPTION

Figure 1:
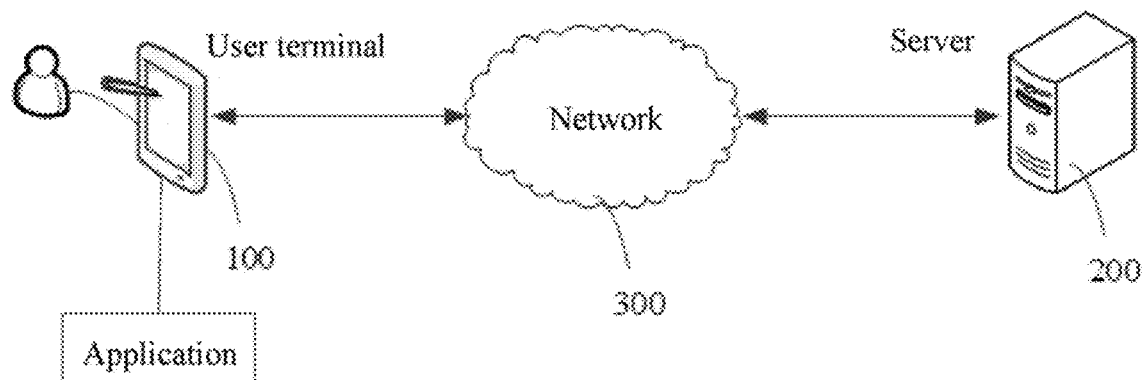
FIG. 1 is a schematic diagram of an application environment of a text-to-speech apparatus and method, a browser and a user terminal according to one embodiment of the present disclosure.

The following clearly and completely describes the technical solutions in the embodiments of the present invention with reference to the accompanying drawings in the embodiments of the present invention. Apparently, the described embodiments are merely some but not all of the embodiments of the present invention. Generally, components in the embodiments of the present invention described and shown in the accompanying drawings may be arranged and designed according to different configurations. Therefore, the embodiments of the present invention are not to limit the protection scope of the present invention, and merely represent selected embodiments of the present invention. All other embodiments obtained by a person skilled in the art based on the embodiments of the present invention without creative efforts shall fall within the protection scope of the present invention.

It should be noted that, reference numerals and letters in the following accompanying drawings represent similar items. Therefore, once an item is defined in an accompanying drawing, the item does not need to be further defined or interpreted in subsequent accompanying drawings. Meanwhile, the terms "first", "second" and the like as used in description of the present invention are merely used for a distinguishing purpose, but shall not be interpreted as indicating or implying relative importance.

The present disclosure provides a technical solution for an automatic text-to-speech conversion. In particular, the present disclosure provides specific rules/instructions for automatically converting text to speech. By implementing the disclosed specific rules, the disclosure makes computer to speak text content with minimal interactions from users, and thus improves functionalities of general computers and servers. According to some embodiments, by programming the computer system with specific instructions, the computer functionalities, in particular, in the area of interface, are improved to make the computer system more convenient to use.

A text-to-speech apparatus and method, a browser, and a user terminal provided in preferred embodiments of present invention may be applied to an application environment shown in FIG. 1. As shown in FIG. 1, a user terminal 100 and a remote server 200 are located in a wireless network or wired network 300, and the user terminal 100 and the remote server 200 exchange data by using the wireless network or wired network 300.

In this embodiment of the present invention, the user terminal 100 is provided with at least one application (APP) that corresponds to the remote server 200 and that provides services for a user.

In this embodiment, the user terminal 100 may be a mobile terminal device, for example, may be a smart phone, a tablet computer, an e-book reader, a portable laptop computer, an in-vehicle computer, or a wearable mobile terminal.

Figure 2:
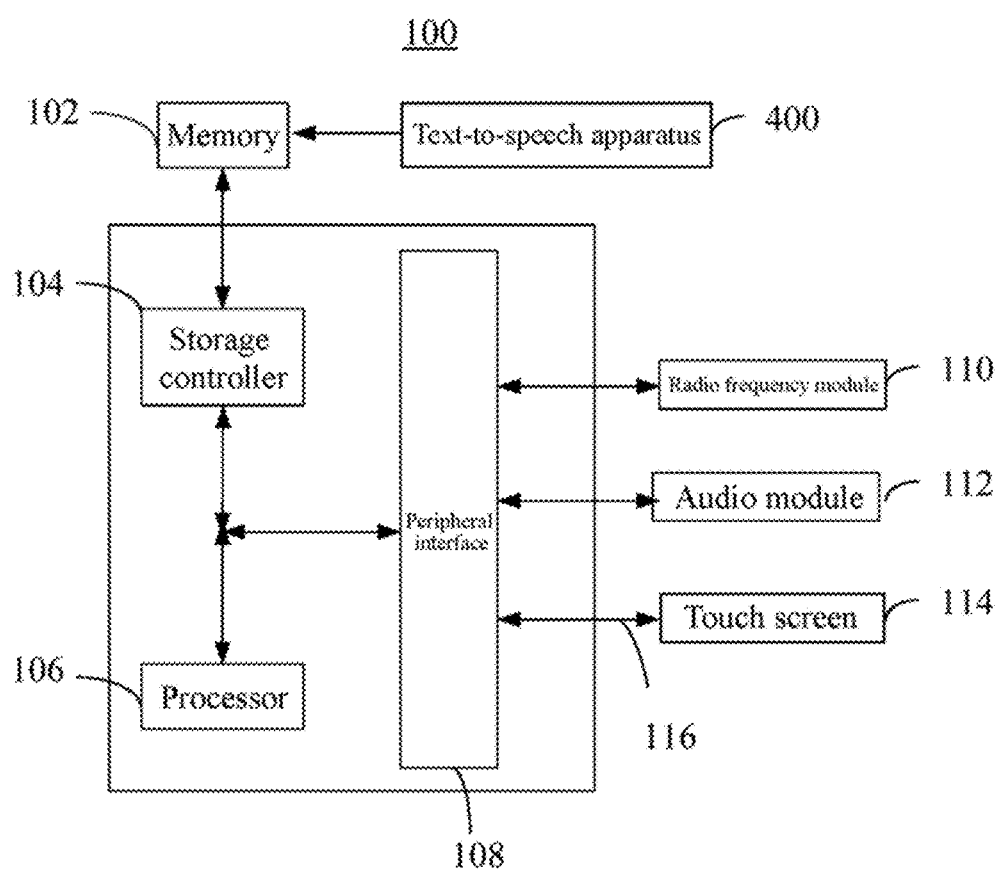
FIG. 2 is a structural block diagram of a user terminal according to one embodiment of the present disclosure.

FIG. 2 is a structural block diagram of a user terminal 100 that may be applied to an embodiment of the present invention. As shown in FIG. 2, the user terminal 100 includes a text-to-speech apparatus 400, a memory 102, a storage controller 104, one or more (only one is shown in the figure) processors 106, a peripheral interface 108, a radio frequency module 110, an audio module 112, a touch screen 114, and the like. Communication is performed between the components by using one or more communications buses/signal cables 116. The text-to-speech apparatus 400 includes at least one software function module that may be stored in the memory 102 or be built in an operating system (OS) of the user terminal 100 in a form of software or firmware.

The memory 102 may be configured to store a software program and module, for example, a program instruction/module corresponding to a text-to-speech apparatus and method in this embodiment. The processor 106 executes the software program and module stored in the memory 102 to perform various function applications and data processing, such as a text-to-speech method provided in this embodiment of the present invention.

The memory 102 may include a high speed random access memory, and may also include a non-volatile memory, for example, one or more magnetic storage devices, a flash memory, or other non-volatile solid-state memory. Access to the memory 102 by the processor 106 and another possible component may be performed under control of the storage controller 104.

Various input/output apparatuses are coupled to the processor 106 and the memory 102 by using the peripheral interface 108. In some embodiments, the peripheral interface 108, the processor 106, and the storage controller 104 may be implemented in a single chip. In other embodiments, the peripheral interface 108, the processor 106, and the storage controller 104 may be separately implemented by using independent chips.

The radio frequency module 110 is configured to receive and send an electromagnetic wave, and implement conversion between an electromagnetic wave and an electrical signal, so as to communicate with a communications network or another device.

The audio module 112 provides an audio interface for a user. The audio interface may include one or more microphones, one or more speakers, and an audio circuit.

The touch screen 114 provides an output and input interface between the user terminal 100 and the user. In this embodiment, the touch screen 114 supports single and multi-touch operations. For example, the touch screen 114 may be a capacitive touch screen, a resistive touch screen, or the like that supports single and multi-touch operations. Supporting single and multi-touch operations means that the touch screen 114 can sense touch operations that are simultaneously performed at one or more positions of the touch screen 114, and delivers the multi-touch operation to the processor 106 for processing.

It may be understood that a structure shown in FIG. 2 is merely an example. The user terminal 100 may include more or fewer components than those shown in FIG. 2, or have a configuration different from that shown in FIG. 2. Each component shown in FIG. 2 may be implemented by using hardware, software or a combination thereof.

According to the text-to-speech apparatus and method, the browser, and the user terminal provided in this embodiment of the present invention, a new text-to-speech method is provided. The text-to-speech apparatus and method and the browser are applicable to a platform such as an Android operating system, an iOS operating system, and a Windows Phone operating system. Specifically, the text-to-speech apparatus and method provided in this embodiment of the present invention may be applied to various APPs (for example, a UC browser client) of the user terminal 100, to play news or other text content in the APPs by voice, which liberates hands and eyes of the user, thereby improving user experience.

The following clearly and completely describes the technical solutions in the embodiments of the present invention with reference to the accompanying drawings in the embodiments of the present invention. Apparently, the described embodiments are merely some but not all of the embodiments of the present invention. Generally, components in the embodiments of the present invention described and shown in the accompanying drawings may be arranged and designed according to different configurations. Therefore, the embodiments of the present invention are not described in detail to limit the protection scope of the present invention, and merely represent selected embodiments of the present invention. All other embodiments obtained by a person skilled in the art based on the embodiments of the present invention without creative efforts shall fall within the protection scope of the present invention.

It should be noted that, reference numerals and letters in the following accompanying drawings represent similar items. Therefore, once an item is defined in an accompanying drawing, the item does not need to be further defined or interpreted in subsequent accompanying drawings. Meanwhile, the terms "first", "second" and the like as used in description of the present invention are merely used for a distinguishing purpose, but shall not be interpreted as indicating or implying relative importance.

First Embodiment

Figure 3:
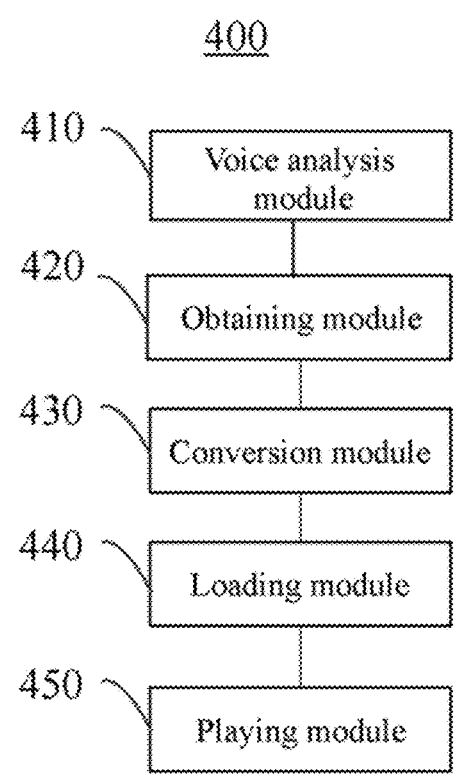
FIG. 3 is a function module diagram of a text-to-speech apparatus according to one embodiment of the present disclosure.

Referring to FIG. 3, FIG. 3 is a function block diagram of a text-to-speech apparatus according to a preferred embodiment of the present invention. The text-to-speech apparatus provided in this preferred embodiment of the present invention includes: a voice analysis module 410, an obtaining module 420, a conversion module 430, a loading module 440, and a playing module 450.

The voice analysis module 410 is configured to output an instruction according to voice information entered by a user.

In this embodiment, the voice information may include first voice information, and the voice analysis module is further configured to output the instruction according to the first voice information entered by the user. The first voice information is information related to text-to-speech content of a browser, for example, a hot topic, entertainment news, or a video. A corresponding instruction that matches the voice information entered by the user may be determined in advance, and the instruction is stored in the memory 102. When the user enters the first voice information, for example, "hot topic", the voice analysis module 410 analyzes the voice information, searches the memory 102 for an instruction matching the voice information, and sends the instruction to the obtaining module 420.

The obtaining module 420 is configured to obtain text information according to the instruction.

In this embodiment, a format of the text information may be a text format such as html, txt, inf, doc, or pdf. Content in the text information may be played by the browser by voice and be loaded to a browser page and displayed. The text information may be prestored in the user terminal 100 or temporarily downloaded from the serve 200. After the analysis module 410 sends the instruction to the obtaining module 420, in response to the instruction, the obtaining module 420 immediately obtains the text information corresponding to the instruction from the user terminal, or downloads the text information corresponding to the instruction from the server 200. For example, the analysis module 410 sends an instruction corresponding to the voice information "hot topic" to the obtaining module 420, and the obtaining module 420 obtains text information corresponding to the instruction. The text information is text information of a hot channel, for example, news, an advertisement, or an entertainment program of the hot channel.

The conversion module 430 is configured to convert the text information to audio.

In this embodiment of the present invention, the conversion module 430 may include a partitioning unit 431, a search unit 432, and a synthesis unit 433.

The partitioning unit 431 is configured to partition the text information into words or phrases.

Because the format of the text information may be the text format such as html, txt, inf, doc, or pdf, content in the text information may include multiple words or phrases. The partitioning unit 431 may partition the content in the text information into words or phrases for subsequent audio conversion.

The search unit 432 is configured to search an audio library for multiple audio segments corresponding to the words or the phrases.

The audio library may be stored in the user terminal 100 or the server 200. The audio library includes audio segments corresponding to words or phrases. The search unit 432 may search the audio library for multiple audio segments corresponding to words or phrases partitioned from the text information.

The synthesis unit 433 is configured to synthesize the multiple audio segments into the audio.

The multiple audio segments found from the audio library may be synthesized into the audio according to a sequence of the words or the phrases in the text information.

The loading module 440 is configured to load the text information to a web page of the browser.

The playing module 450 is configured to play the audio.

In one embodiment, after the text information is converted to the audio, the audio may be immediately played by the playing module 450. Further, the playing module 450 may invoke the audio module 112 of the user terminal 100 to play the audio.

Further, the obtaining module 420 is configured to obtain audio information corresponding to the text information according to the instruction.

In one embodiment, the audio information corresponding to the text information may be prestored in the user terminal 100 or be temporarily downloaded from the server 200. Therefore, the obtaining module 420 may obtain the audio information corresponding to the text information from the user terminal 100 or the server 200. The playing module 450 may play the audio information without converting the text information to the audio for playing.

Second Embodiment

The second embodiment of the present invention provides a text-to-speech apparatus. The text-to-speech apparatus provided in this embodiment includes: a voice analysis module 410, an obtaining module 420, a conversion module 430, and a playing module 440.

The voice analysis module 410 is configured to output an instruction according to voice information entered by a user.

In this embodiment, the voice information includes first voice information and second voice information. The voice analysis module 410 may provide a first prompt voice according to the first voice information entered by the user, analyze the second voice information that is entered by the user in response to the first prompt voice, and output the instruction. In the second embodiment of the present invention, the first voice information is information that is related to system operation of a browser but is irrelevant to text-to-speech content. After receiving the first voice information, the voice analysis module 410 may provide the first prompt voice to the user, so as to prompt the user to perform a next operation, for example, playing news or playing a video. For example, when the first voice information entered by the user is "playing news", the voice analysis module 410 analyzes the first voice information "playing news", and feeds back a first prompt voice "please select a channel". In response to the first prompt voice "please select a channel", the user enters the second voice information "hot topic". The voice analysis module 410 analyzes the second voice information "hot topic" entered by the user and outputs the instruction.

In one embodiment, a corresponding instruction that matches the voice information entered by the user may be determined in advance, and the instruction is stored in the memory 102. The voice analysis module 410 analyzes the second voice information, searches the memory 102 for an instruction matching the second voice information, and sends the instruction to the obtaining module 420.

The obtaining module 420 is configured to obtain text information and/or audio information corresponding to the text information according to the instruction.

In one embodiment, a format of the text information may be a text format such as html, txt, inf, doc, or pdf. Content in the text information may be played by the browser by voice and be loaded to a browser page and displayed. The text information may be prestored in the user terminal 100 or temporarily downloaded from the server 200. After the analysis module 410 sends the instruction to the obtaining module 420, in response to the instruction, the obtaining module 420 obtains the text information corresponding to the instruction from the user terminal 100, or downloads the text information corresponding to the instruction from the server 200.

The conversion module 430 is configured to convert the text information to audio. The conversion module 430 may include a partitioning unit 431, a search unit 432, and a synthesis unit 433. The partitioning unit 431 is configured to partition the text information into words or phrases. The search unit 432 is configured to search an audio library for multiple audio segments corresponding to the words or the phrases. The synthesis unit 433 is configured to synthesize the multiple audio segments into the audio.

A loading module 440 is configured to load the text information to a web page of the browser. The playing module 450 is configured to play the audio or the audio information corresponding to the text information. It should be noted that, an execution sequence of the loading module 440 and the playing module 450 is not limited in this embodiment of the present invention. For example, the loading module 440 first loads the text information to a web page of the browser, and the playing module 450 plays the audio or the audio information corresponding to the text information. Alternatively, the playing module 450 first plays the audio or the audio information corresponding to the text information, and the loading module 440 loads the text information to a web page of the browser. Alternatively, when the loading module 440 loads the text information to a web page of the browser, the playing module 450 plays the audio or the audio information corresponding to the text information. Further, the playing module 450 may be further configured to play a second prompt voice after playing of the audio is completed. For example, the second prompt voice may be "please select another channel".

Third Embodiment

Figure 4:
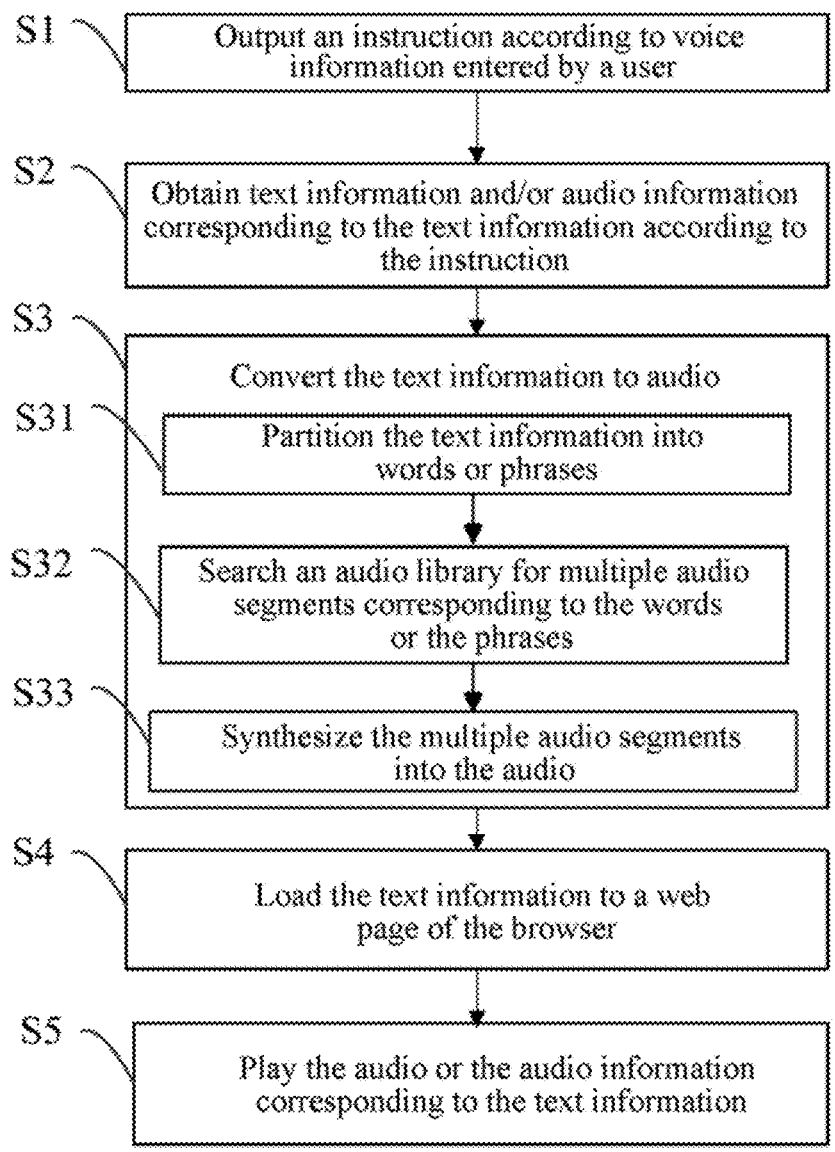
FIG. 4 is a flowchart of a text-to-speech method according to one embodiment of the present disclosure.

Referring to FIG. 4, FIG. 4 is a flowchart of a text-to-speech method according to the third embodiment of the present invention. The text-to-speech method provided in the third embodiment of the present invention includes the following steps.

Step S1: Output an instruction according to voice information entered by a user.

In this embodiment of the present invention, step S1 may be performed by the voice analysis module 410. The voice information may include first voice information, and step S1 includes outputting the instruction according to the first voice information entered by the user. The first voice information is information related to text-to-speech content of a browser, for example, a hot topic, entertainment news, or a video. A corresponding instruction that matches the voice information entered by the user may be determined in advance, and the instruction is stored in the memory 102. After the user modifies settings of the browser and sets the browser to a "voice mode", when the user enters the first voice information, for example, "hot topic", the voice analysis module 410 analyzes the voice information, searches the memory 102 for an instruction matching the voice information, and sends the instruction to the obtaining module 420.

Step S2: Obtain text information and/or audio information corresponding to the text information according to the instruction.

Step S2 may be performed by the obtaining module 420. The text information is a page of voice section, and is generally a customized page in plain text. A format of the text information may be a text format such as html, txt, inf, doc, or pdf. Content in the text information may be played by the browser by voice and be loaded to a browser page and displayed. The text information may be prestored in the user terminal 100 or may be temporarily downloaded from the serve 200 by means of interaction with the server 200 based on a particular protocol. After the analysis module 410 sends the instruction to the obtaining module 420, in response to the instruction, the obtaining module 420 immediately obtains the text information corresponding to the instruction from the user terminal 100, or downloads the text information corresponding to the instruction from the server 200. For example, the analysis module 410 sends an instruction corresponding to the voice information "hot topic" to the obtaining module 420, and the obtaining module 420 immediately obtains text information corresponding to the instruction. The text information is text information of a hot channel, for example, news, an advertisement, or an entertainment program of the hot channel.

In this embodiment, the audio information corresponding to the text information may be prestored in the user terminal 100 or be temporarily downloaded from the server 200. Therefore, the obtaining module 420 may obtain the audio information corresponding to the text information from the user terminal 100 or the server 200. The playing module 450 may play the audio information without converting the text information to the audio for playing.

Step S3: Convert the text information to audio.

Step S3 may be performed by the conversion module 430. Further, step S3 may include the following steps.

Step S31: Partition the text information into words or phrases.

In this embodiment, step S31 may be performed by the partitioning unit 431. Because the format of the text information may be the text format such as html, txt, inf, doc, or pdf, content in the text information may include multiple words or phrases. The partitioning unit 431 may partition the content in the text information into words or phrases for subsequent audio conversion.

Step S32: Search an audio library for multiple audio segments corresponding to the words or the phrases.

In this embodiment, step S32 may be performed by the search unit 432. The audio library may be stored in the user terminal 100 or the server 200. The audio library includes audio segments corresponding to words or phrases. The search unit 432 may search the audio library for multiple audio segments corresponding to words or phrases partitioned from the text information.

Step S33: Synthesize the multiple audio segments into the audio.

In this embodiment, step S33 may be performed by the synthesis unit 433. The synthesis unit 433 may synthesize the multiple audio segments found from the audio library into the audio according to a sequence of the words or the phrases in the text information.

Step S4: Load the text information to a web page of the browser. Step S4 may be performed by the loading module 440.

Step S5: Play the audio or the audio information corresponding to the text information.

In this embodiment, step S5 may be performed by the playing module 450. After the text information is converted to the audio, the audio may be immediately played by the playing module 450. Further, the playing module 450 may invoke the audio module 112 of the user terminal 100 to play the audio or audio information.

It should be noted that, an execution sequence of step S4 and step S5 is not limited in this embodiment of the present invention. For example, the text information is first loaded to a web page of the browser, and the audio is played. Alternatively, the audio is first played, and the text information is loaded to a web page of the browser. Alternatively, when the text information is loaded to a web page of the browser, the audio is played.

Fourth Embodiment

Figure 5:
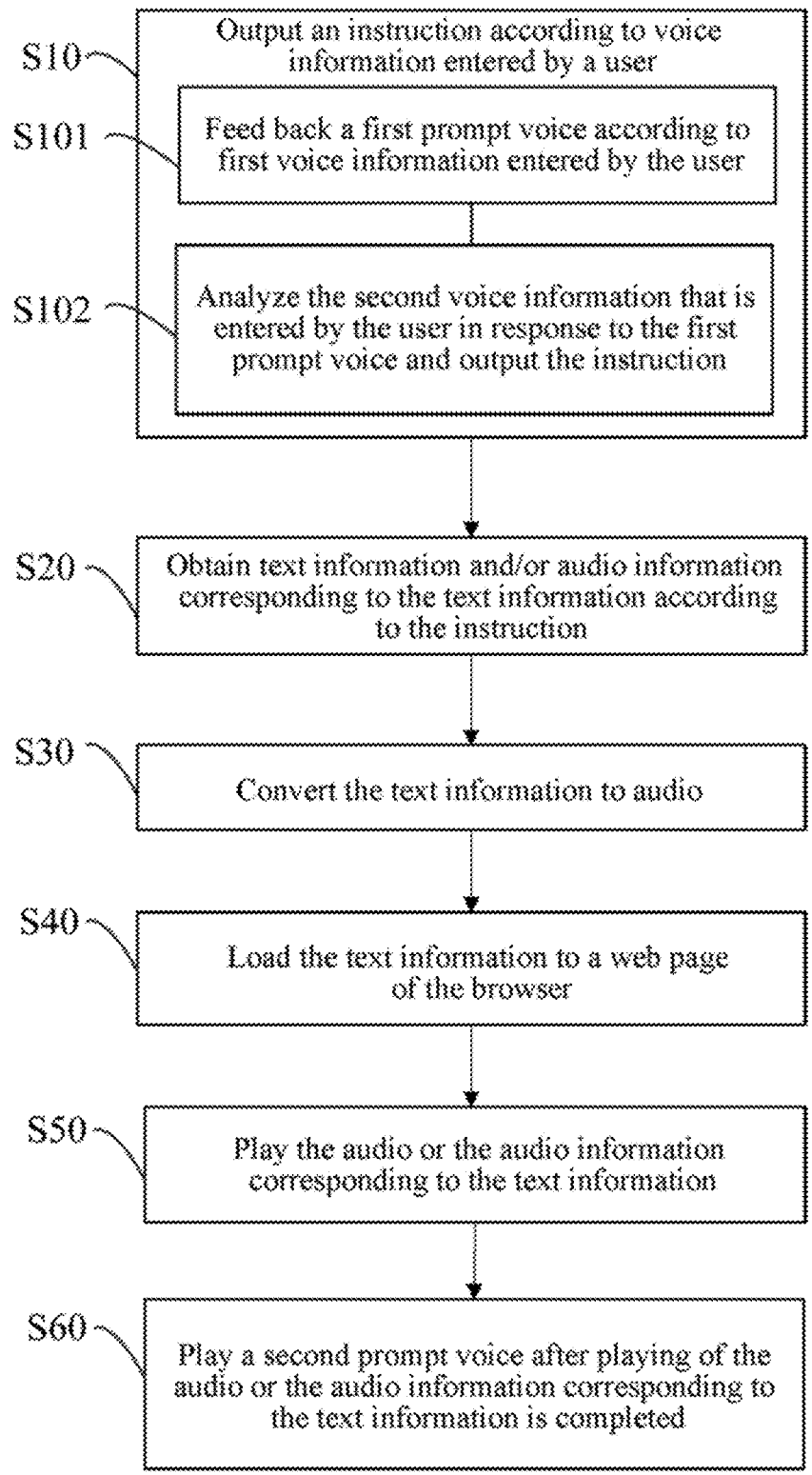
FIG. 5 is a flowchart of another text-to-speech method according to one embodiment of the present disclosure.

Referring to FIG. 5, FIG. 5 is a flowchart of a text-to-speech method according to the fourth embodiment of the present invention. The text-to-speech method provided in the fourth embodiment of the present invention includes the following steps.

Step S10: Output an instruction according to voice information entered by a user.

In this embodiment of the present invention, step S10 may be performed by the voice analysis module 410. The voice information may include first voice information and second voice information.

Further, step S10 may include: Step S101: Provide a first prompt voice according to first voice information entered by the user. Step S102: Analyze the second voice information that is entered by the user in response to the first prompt voice and output the instruction.

In the fourth embodiment of the present invention, the first voice information is information that is related to system operation of a browser but is irrelevant to text-to-speech content. After receiving the first voice information, the voice analysis module 410 may provide the first prompt voice to the user, so as to prompt the user to perform a next operation, for example, playing news or playing a video. For example, when the first voice information entered by the user is "playing news", the voice analysis module 410 analyzes the first voice information "playing news", and feeds back a first prompt voice "please select a channel" to the user. In response to the first prompt voice "please select a channel", the user enters the second voice information "hot topic". The voice analysis module 410 analyzes the second voice information "hot topic" entered by the user and outputs the instruction.

In this embodiment, a corresponding instruction that matches the voice information entered by the user may be determined in advance, and the instruction is stored in the memory 102. The voice analysis module 410 analyzes the second voice information, searches the memory 102 for an instruction matching the second voice information, and sends the instruction to the obtaining module 420.

Step S20: Obtain text information and/or audio information corresponding to the text information according to the instruction. In this embodiment of the present invention, step S20 may be performed by the obtaining module 420.

Step S30: Convert the text information to audio. In this embodiment of the present invention, step S30 may be performed by the conversion module 430.

Implementation of step S30 in the fourth embodiment of the present invention is the same as that of step S3 in the third embodiment, and details are not described herein again.

Step S40: Load the text information to a web page of the browser. In this embodiment of the present invention, step S40 may be performed by the loading module 440.

Step S50: Play the audio or the audio information corresponding to the text information. In this embodiment of the present invention, step S50 may be performed by the playing module 450.

Step S60: Play a second prompt voice after playing of the audio or the audio information corresponding to the text information is completed. In this embodiment of the present invention, step S60 may be performed by the playing module 450. The second prompt voice may be a voice prompting the user to perform a next operation, for example, "please select another channel".

It should be noted that, in this embodiment of the present invention, if the audio information corresponding to the text information is obtained, the audio information may be directly played without converting the text information to the audio for playing. If the audio information corresponding to the text information is not obtained, the text information needs to be converted to the audio for playing.

According to the text-to-speech apparatus and method, the browser, and the user terminal provided in the embodiments of the present invention, an instruction is output according to voice information entered by a user; text information is obtained according to the instruction; the text information is converted to audio; and the audio is played. According to the embodiments of the present invention, news or other text content in a browser can be played by voice, which liberates hands and eyes of a user. The user can use the browser in some scenarios where the user cannot easily use the browser, such as driving a car, thereby improving user experience. In addition, the obtained text information is information in a voice section, and may be directly converted to the audio for playing without a complex processing procedure, thereby improving efficiency.

In the several embodiments provided in the present application, it should be understood that the disclosed apparatus and method may also be implemented in other manners. The described apparatus embodiments are merely examples. For example, the flowchart and block diagram in the accompanying drawings show a system architecture, a function, and operation that may be implemented according to the apparatus, method, and computer program product in the multiple embodiments of the present invention. In this point, each block in the flowchart or the block diagram may represent one module, one program segment, or a part of code, and the module, the program segment, or the part of code includes one or more executable instructions that are used to implement a specified logical function. It should also be noted that, in some alternative implementation manners, function indicated in blocks may occur in a sequence that is different from that indicated in the accompanying drawings. For example, two consecutive blocks may basically be performed simultaneously, and they may also be performed in a different sequence sometimes. This is specified according to related functions. It should also be noted that, each block in the block diagram and/or the flowchart and a combination of the blocks in the block diagram and/or the flowchart may be implemented by using a dedicated hardware-based system that performs a specified function or action, or may be implemented by using a combination of dedicated hardware and computer instructions.

In addition, each function module in each embodiment of the present invention may be integrated to form an independent part, each module may separately exist, or two or more modules are integrated to form an independent part.

When the functions are implemented in the form of a software function module and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It should be noted that, the relational terms "first", "second", and the like herein merely are used to distinguish an entity or operation from another entity or operation without necessarily requiring or implying any actual such relationship or order between such entities or actions. In addition, the terms "include", "comprise", and any other variant intend to cover non-exclusive inclusion, so that including processes, methods, articles, or devices of a series of elements not only includes such elements, and also includes other elements that are not explicitly listed, or also includes inherent elements of such processes, methods, articles, or devices. Without more limitations, an element that is limited by a sentence "including one . . . " does not exclude that another same element also exists except for such processes, methods, articles, or devices of the elements.

Described above are merely embodiments of the present invention, and are not intended to limit the present invention. For a person skilled in the art, various alternations and changes may be made to the present invention. Any modification, equivalent replacement, improvement, and the like made without departing from the spirit and principle of the present invention shall fall within the protection scope of the present invention. It should be noted that, reference numerals and letters in the following accompanying drawings represent similar items. Therefore, once an item is defined in an accompanying drawing, the item does not need to be further defined or interpreted in subsequent accompanying drawings.

What is claimed is:

1. A text-to-speech method, implemented by a user terminal having a browser, wherein the text-to-speech method comprises:
  receiving first voice information entered by a user, wherein the first voice information comprises a participle of a verb;
  determining a function requested in the first voice information entered by the user by analyzing the participle of the verb;
  obtaining a set of prestored instructions based on the function requested in the first voice information entered by the user;
  obtaining a first prompt voice based on the set of prestored instructions;
  feeding back the first prompt voice to prompt the user for second voice information comprising an adjective corresponding to the set of prestored instructions;
  receiving the second voice information comprising the adjective that is entered by the user in response to the first prompt voice;
  searching a memory of the user terminal for a prestored instruction from the set of prestored instructions which matches the second voice information comprising the adjective entered by the user;
  outputting the prestored instruction according to the second voice information comprising the adjective entered by the user;
  obtaining text information according to the prestored instruction, by:
    determining whether the text information is prestored in the user terminal;
    in response to determining that the text information is prestored in the user terminal, obtaining the text information from the user terminal according to the prestored instruction; and
    in response to determining that the text information is not stored in the user terminal, obtaining the text information from a server according to the prestored instruction;
  obtaining prestored audio information according to the text information; and
  playing the prestored audio information.

2. The text-to-speech method according to claim 1, wherein the text-to-speech method further comprises loading the text information to a web page of the browser.

3. The text-to-speech method according to claim 1, wherein the prestored audio information was obtained by:
  partitioning the text information into words or phrases;
  searching an audio library for multiple audio segments corresponding to the words or the phrases;
  synthesizing the multiple audio segments into audio information; and
  storing the audio information.

4. The text-to-speech method according to claim 1, wherein the text-to-speech method further comprises playing a second prompt voice after playing of the audio is completed.

5. The text-to-speech method of claim 1, wherein the obtaining prestored audio information according to the text information comprises obtaining the prestored audio information without converting the text information to an audio.

6. The text-to-speech method of claim 1, further comprising:
  in response to determining that the prestored audio information is not available, converting the text information to an audio.

7. A non-transitory computer-readable storage medium storing instructions that, when executed by a processor of a computer system, cause the computer system to perform a method comprising:
  receiving first voice information entered by a user, wherein the first voice information comprises a participle of a verb;

determining a function requested in the first voice information entered by the user by analyzing the participle of the verb;
obtaining a set of prestored instructions based on the function requested in the first voice information entered by the user;
obtaining a first prompt voice based on the set of prestored instructions;
feeding back the first prompt voice to prompt the user for second voice information comprising an adjective corresponding to the set of prestored instructions;
receiving the second voice information comprising the adjective that is entered by the user in response to the first prompt voice;
searching a memory of the user terminal for a prestored instruction from the set of prestored instructions which matches the second voice information comprising the adjective entered by the user;
outputting the prestored instruction according to the second voice information comprising the adjective entered by the user;
obtaining text information according to the prestored instruction, by:
  determining whether the text information is prestored in the user terminal;
  in response to determining that the text information is prestored in the user terminal, obtaining the text information from the user terminal according to the prestored instruction; and
  in response to determining that the text information is not stored in the user terminal, obtaining the text information from a server according to the prestored instruction;
obtaining prestored audio information according to the text information; and
playing the prestored audio information.

8. The non-transitory computer-readable storage medium according to claim 7, wherein the method further comprises loading the text information to a web page of a browser.

9. The non-transitory computer-readable storage medium according to claim 7, wherein the method further comprises:
obtaining the prestored audio information by:
  partitioning the text information into words or phrases;
  searching an audio library for multiple audio segments corresponding to the words or the phrases;
  synthesizing the multiple audio segments into audio information; and
  storing the audio information.

10. A user terminal, comprises:
a processor; and
a memory storing executable instructions that, when executed by the processor, cause the processor to:
receive first voice entered by a user, wherein the first voice information comprises a participle of a verb;
determining a function requested in the first voice information entered by the user by analyzing the participle of the verb;
obtain a set of prestored instructions based on the function requested in the first voice information entered by the user;
obtain a first prompt voice based on the set of prestored instructions;
provide the first prompt voice to prompt the user for second voice information comprising an adjective corresponding to the set of prestored instructions;
receive the second voice information comprising the adjective that is entered by the user in response to the first prompt voice;
search the memory of the user terminal for a prestored instruction from the set of prestored instructions which matches the second voice information comprising the adjective entered by the user;
obtain the prestored instruction according to the second voice information comprising the adjective entered by the user;
obtain text information according to the prestored instruction, by:
  determining whether the text information is prestored in the user terminal;
  in response to determining that the text information is prestored in the user terminal, obtaining the text information from the user terminal according to the prestored instruction; and
  in response to determining that the text information is not stored in the user terminal, obtaining the text information from a server according to the prestored instruction;
obtain prestored audio information according to the text information; and
play the prestored audio information.

11. The user terminal according to claim 10, wherein the memory further stores executable instructions that, when executed by the processor, cause the processor to: load the text information to a web page of a browser.

12. The user terminal according to claim 10, wherein the memory further stores executable instructions that, when executed by the processor, cause the processor to:
obtain the prestored audio information by:
  partitioning the text information into words or phrases;
  searching an audio library for multiple audio segments corresponding to the words or the phrases; and
  synthesizing the multiple audio segments into the audio.

13. The user terminal according to claim 10, wherein the memory further stores executable instructions that, when executed by the processor, cause the processor to: play a second prompt voice after playing of the audio is completed.

* * * * *